United States Patent
Buscart

(10) Patent No.: US 6,658,704 B2
(45) Date of Patent: Dec. 9, 2003

(54) LOCKING DEVICE

(75) Inventor: Jordi Badrenas Buscart, Barcelona (ES)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/302,584

(22) Filed: Nov. 22, 2002

(65) Prior Publication Data

US 2003/0121126 A1 Jul. 3, 2003

Related U.S. Application Data

(60) Provisional application No. 60/345,718, filed on Jan. 3, 2002.

(51) Int. Cl.[7] .............................................. F16G 11/00
(52) U.S. Cl. ................ 24/115 G; 24/115 M; 24/115 H; 24/136 L
(58) Field of Search .......................... 24/115 G, 115 M, 24/115 K, 115 H, 136 L, 66.9; 403/208, 209, 210; 160/178.2

(56) References Cited

U.S. PATENT DOCUMENTS

| | | | | | |
|---|---|---|---|---|---|
| 4,453,292 A | * | 6/1984 | Bakker | ...................... | 24/115 G |
| 4,622,723 A | * | 11/1986 | Krauss | ...................... | 24/115 G |
| 4,794,673 A | * | 1/1989 | Yamaguchi | ............... | 24/115 G |
| 4,811,466 A | * | 3/1989 | Zubli | ........................ | 24/115 G |
| 5,197,166 A | * | 3/1993 | Meier et al. | ............. | 24/115 G |
| 5,621,952 A | * | 4/1997 | Frano | ....................... | 24/115 G |
| 5,737,808 A | * | 4/1998 | Ikeda | ....................... | 24/115 G |
| 6,018,851 A | * | 2/2000 | Anscher | ................... | 24/115 G |

* cited by examiner

*Primary Examiner*—Victor Sakran
(74) *Attorney, Agent, or Firm*—Mark W. Croll; Paul F. Donovan

(57) ABSTRACT

A cord lock has a body and plunger in which a cord is secured, and an extension sleeve designed for insertion through an opening in an article or fabric to which the cord lock is attached. A back plate is engaged along the length of the extension sleeve, to pinch the fabric or article between the body and back plate.

22 Claims, 5 Drawing Sheets

LOCKING DEVICE

CROSS-REFERENCE TO RELATED APPLICATION

This application claims benefit to U.S. provisional application Serial No. 60/345,718, filed on Jan. 3, 2002.

FIELD OF THE INVENTION

The present invention relates generally to mechanisms that can be secured at locations along a string, cord or the like, and, more particularly, to cord locks used for example on cords, drawstrings, and the like used on, for example, clothing, luggage, sporting gear and the like.

BACKGROUND OF THE INVENTION

Drawstrings and cords are used extensively on various items such as, for example, articles of clothing, sporting goods, back packs and other luggage or the like. For example, hoods on jackets, sweatshirts and other garments commonly are provided with drawstrings around the front opening, allowing the hood to be tightly closed around the face of the wearer. Clothing such as sweat pants, shorts, swim trunks and the like commonly use drawstrings in the waist band, allowing the garment to be drawn snug around a wearers waist, without the need for a separate belt. On luggage, backpacks and other gear, drawstrings and cords are used to close pockets and other openings, secure holders, and the like. In a simple application, a drawstring can be secured simply by tying together the two ends thereof or, if the drawstring is provided as a continuous loop, pulling a segment of the loop together and tying a simple knot.

In some uses of drawstrings and cords, a simple knot works effectively in securing the drawstring or cord. However, in other uses, a simple knot can work loose, allowing slack into the drawstring or cord. Complex knots can be used to prevent loosening but have the disadvantage of being complicating to form and difficult to untie. Further, not all users have familiarity with sufficient knot tying techniques, or may lack the dexterity required to form the knot properly with the cord or drawstring in a taut condition. The use of even a simple knot is inconvenient if frequent adjustments in the cord are required.

To overcome the difficulties associated with tying drawstrings and cords to secure them, cord locks have been used. The cord is passed through the cord lock, which in one way or another pinches or binds the cord therein. In a known use, the cord lock simply slides along the cord with the pinching mechanism disengaged, and stays in position on the cord with the pinching mechanism engaged. Using cord locks of such a design can be inconvenient in that there are three separate, discrete items to be manipulated; the cord, the lock and the article on which the cord is used. Unless the end of the cord is knotted or enlarged, the cord lock can be slid off the end of the cord and subsequently lost. It is known to secure a cord lock to an article by use of a separate lanyard. This, too can make use of the cord lock awkward and cumbersome.

What is needed in the art is a cord lock that can be anchored directly to the article in which the cord is installed.

SUMMARY OF THE INVENTION

The present invention provides a cord lock that is secured directly to the article surrounding the hole through which the cord or drawstring extends.

In one aspect thereof, the invention provides a cord lock with a body defining a hole extending therethrough, and a pocket substantially orthogonal to the bole. The pocket has a pocket opening on an edge of the body. An annular sleeve has a sleeve hole aligned with the hole in the body. The sleeve is connected to the body and projects from the body. A plunger is received in the pocket, and defines a plunger hole. The plunger is moveable in the pocket substantially orthogonal to the aligned body and sleeve holes, between a first position in which the plunger hole is aligned with the aligned body and sleeve holes and a second position in which the plunger hole is misaligned with the aligned body and sleeve holes. Spring means biases the plunger toward the second position. A back plate is secured to the sleeve.

In another aspect thereof, the invention provides a cord lock mountable on an article. A body defines a hole adapted to receive a cord slidable therethrough. A plunger in the body binds the cord in the body. An extension sleeve from the body projects through a hole in the article, with the body disposed on one side of one the article; and a back plate engaged on the extension sleeve on an opposite side of the article from the body. The body and plate are adapted to pinch a portion of the article therebetween.

In a further aspect thereof, the invention provides a method for assembling an article with a cord having a cord lock. The method includes providing an article, a cord, and a cord lock, the cord lock having a body, an extension sleeve and a back plate; forming a hole in the article; inserting the cord lock extension sleeve through the hole in the article; pinching a portion of the article between the body and the back plate, while securing the back plate on the extension sleeve; and binding the cord in the cord lock.

An advantage of the present invention is providing a cord lock that can be secured directly on a fabric without the need for ties, auxiliary strings, lanyards or the like.

Another advantage of the present invention is providing a cord lock that supplies reinforcement around a hole through which a cord extends, thereby reducing fraying, binding and interference between the cord and the fabric.

Still another advantage of the present invention is providing a cord lock that is easy to use and simplifies assembly of an article using a cord and cord lock.

Other features and advantages of the invention will become apparent to those skilled in the art upon review of the following detailed description, claims and drawings in which like numerals are used to designate like features.

Figure 1:
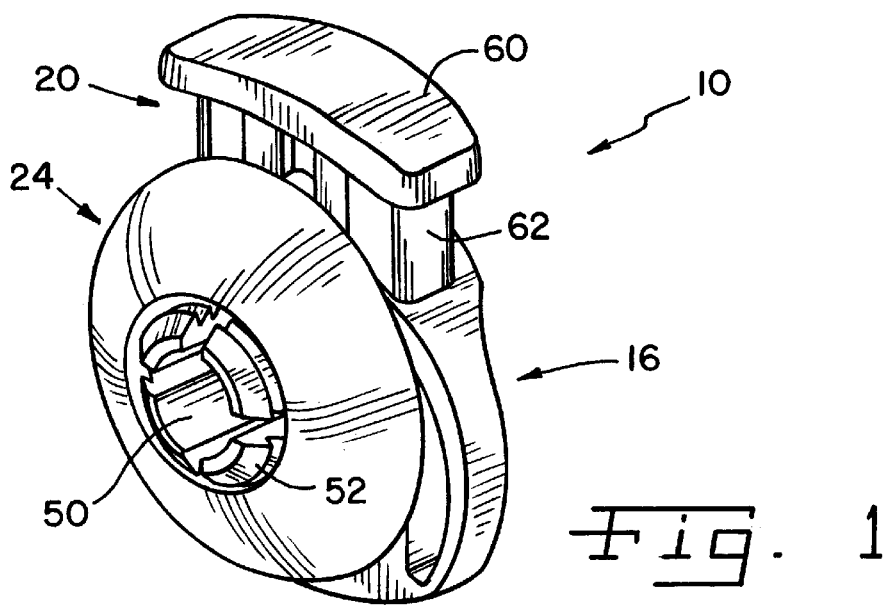
FIG. 1 is a perspective view of a cord lock embodying the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof, as well as additional items and equivalents thereof. Unless otherwise specifically stated, it is to be understood that steps in the methods described herein can be performed in varying sequences.

DETAILED DESCRIPTION OF THE PREFERRED EMBODIMENT

Figure 2:
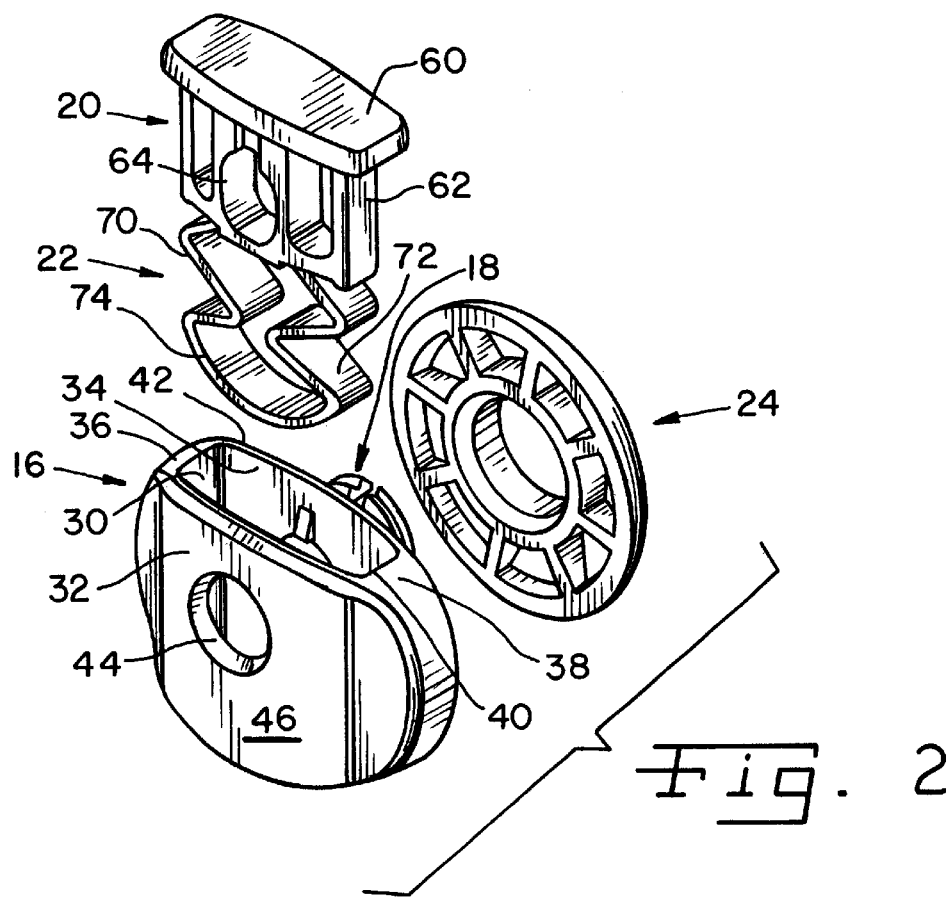
FIG. 2 is an exploded view of the cord lock shown in FIG. 1.

Referring now more specifically to the drawings, and to FIGS. 1 and 2 in particular, an example of a cord lock 10 embodying certain aspects of the present invention is shown. Cord lock 10 is used for securing a cord 12 (FIG. 4) on an article or fabric 14 (FIG. 4) in a manner such that the relative position of cord 12 with respect to article or fabric 14 can be adjusted. It should be understood that cord lock 10 can be manufactured in various sizes and shapes to secure different types of cords 12 or strings or straps or the like of different diameters or sizes without departing from the principles and features of the present invention. Further, while article or fabric 14 is shown as a single ply of fabric, it should be understood that article or fabric 14 can be multi-ply and can be of different thickness. An advantage of the present invention is that cord lock 10 can be used on a variety of types of articles or fabrics 14, such as luggage, suitcases, sport bags, clothing and the like.

Cord lock 10 includes a body 16 connected to or formed integrally with an extension sleeve 18. A plunger 20 is associated with body 16, together with a spring means 22, to releasably secure cord 12 relative to body 16. A back plate 24 is provided on extension sleeve 18, to secure cord lock 10 relative to article or fabric 14.

Body 16 can be molded plastic or the like, and has a generally hollow shape, defining a pocket 30 within it. In forming and defining pocket 30, body 16 has a front wall 32, a back wall 34 disposed generally opposite to front wall 32 and opposed first and second side walls 36 and 38, respectively, between front wall 32 and back wall 34. Pocket 30 has an opening 40 thereto, disposed in an edge 42 of body 16. Body 16 further defines a hole 44 extending therethrough from a front face 46 of front wall 32 through front wall 32, into pocket 30, and from pocket 30 through back wall 34. The portions of hole 44 in front wall 32 and back wall 34 are in substantial axial alignment.

Extension sleeve 18 is secured to body 16, or may be formed integrally therewith. Extension sleeve 18 projects outwardly from back wall 34 of body 16. Thus, molding of body 16 and extension sleeve 18 as a single structure from plastic or the like is suitable. Extension sleeve 18 is a cylindrical body defining a central hole 50 therethrough. Hole 50 extends entirely through extension sleeve 18 and into pocket 30. Hole 50 of extension sleeve 18 is provided substantially aligned with hole 44 of body 16. Hole 44 and hole 50 are provided spaced from edge 42, but are entirely within the area defined by pocket 30. A plurality of projections 52 are provided on the external surface of extension sleeve 18 and are adapted for attachment with back plate 24. Projections 52 may define a plurality of circumferential or part circumferential ridges, or may be a screw thread, or the like. As will be further explained below, back plate 24 is preferably ratchetly received on to projections 52 to accommodate articles or fabrics 14 of varying thickness.

Plunger 20 is provided in a size and shape to fit slidably within pocket 30, relatively snuggly between front wall 32 and back wall 34, and between first and second side walls 36 and 38. Plunger 20 can move in directions inwardly and outwardly relative to opening 40 of pocket 30, generally orthogonal to aligned holes 44 and 50. Plunger 20 includes a plunger top 60 and a plunger body 62. Plunger body 62 slides within pocket 30, while plunger top 60 defines a cap on body 62. Preferably, plunger top 60 is generally larger than opening 40 such that plunger top 60 cannot be pushed into pocket 30, although alternative configurations would be suitable. Plunger body 62 defines a plunger hole 64 extending therethrough, from a front side thereof to a back side thereof, at a position spaced from plunger top 60. Plunger body 62 is movable within pocket 30 between a first position in which plunger hole 64 is aligned with the aligned body and extension sleeve holes 44 and 50, and a second position in which plunger hole 64 is misaligned with aligned body and extension sleeve holes 44 and 50.

Spring means or any suitable biasing device 22 is disposed in pocket 30 between a bottom (not shown) of pocket 30 and plunger body 62. In the embodiment illustrated in FIG. 2, spring means 22 is integrally formed with plunger body 62, and includes folded first and second legs 70 and 72 connected to plunger body 62 and a central foot 74 between legs 70 and 72 at ends thereof opposite body 62. The folded, accordion structure of legs 70 and 72 provides a spring biasing effect of plunger body 62 outwardly relative to pocket 30, toward positions in which plunger hole 64 is misaligned with aligned holes 44 and 50. Spring means 22 and plunger 20 can be formed integrally as a molded plastic piece.

Figure 3:
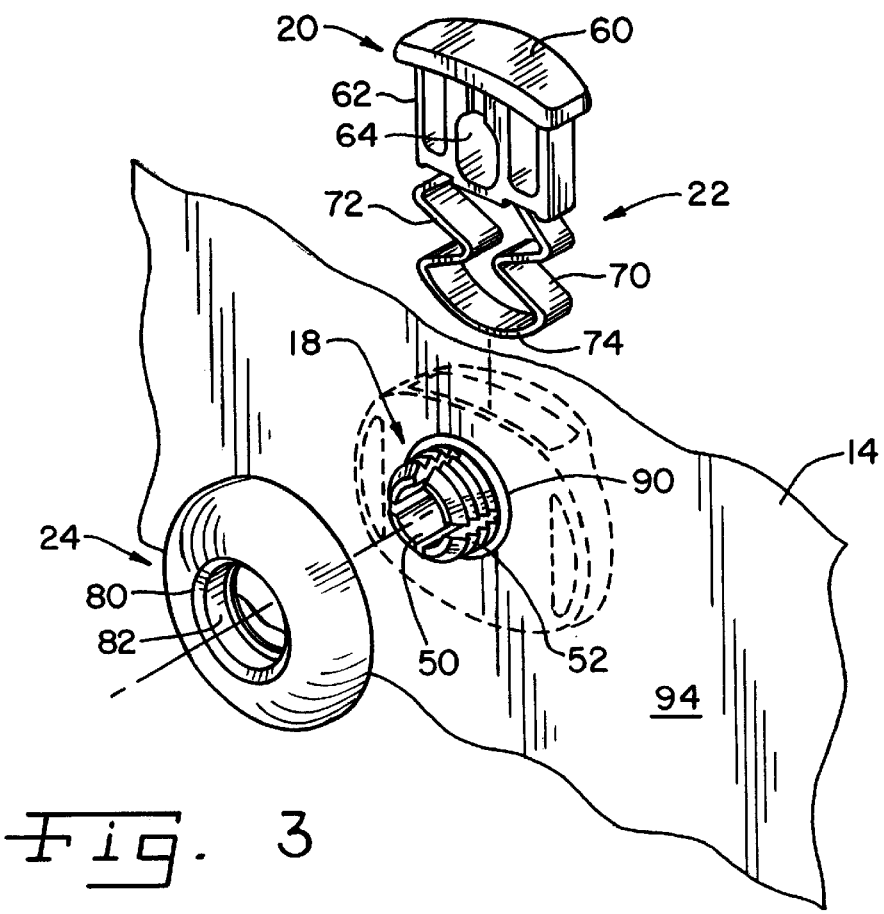
FIG. 3 is an exploded view of the cord lock, illustrating the manner in which the cord lock is attached to a piece of fabric.
Figure 8:
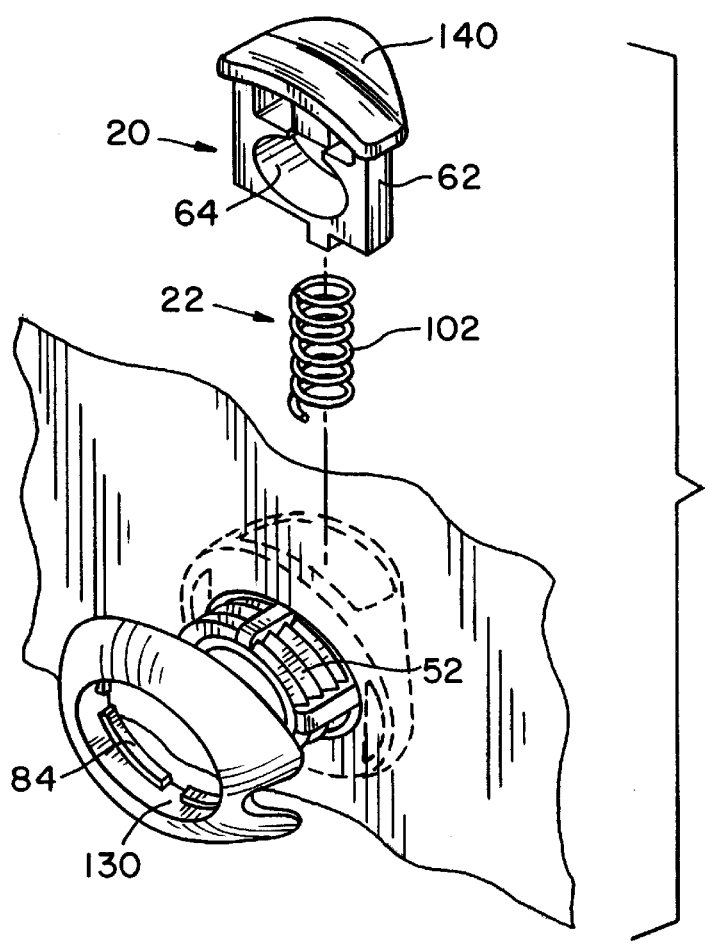
FIG. 8 is a further exploded view of the second embodiment, illustrating installation.
Figure 9:
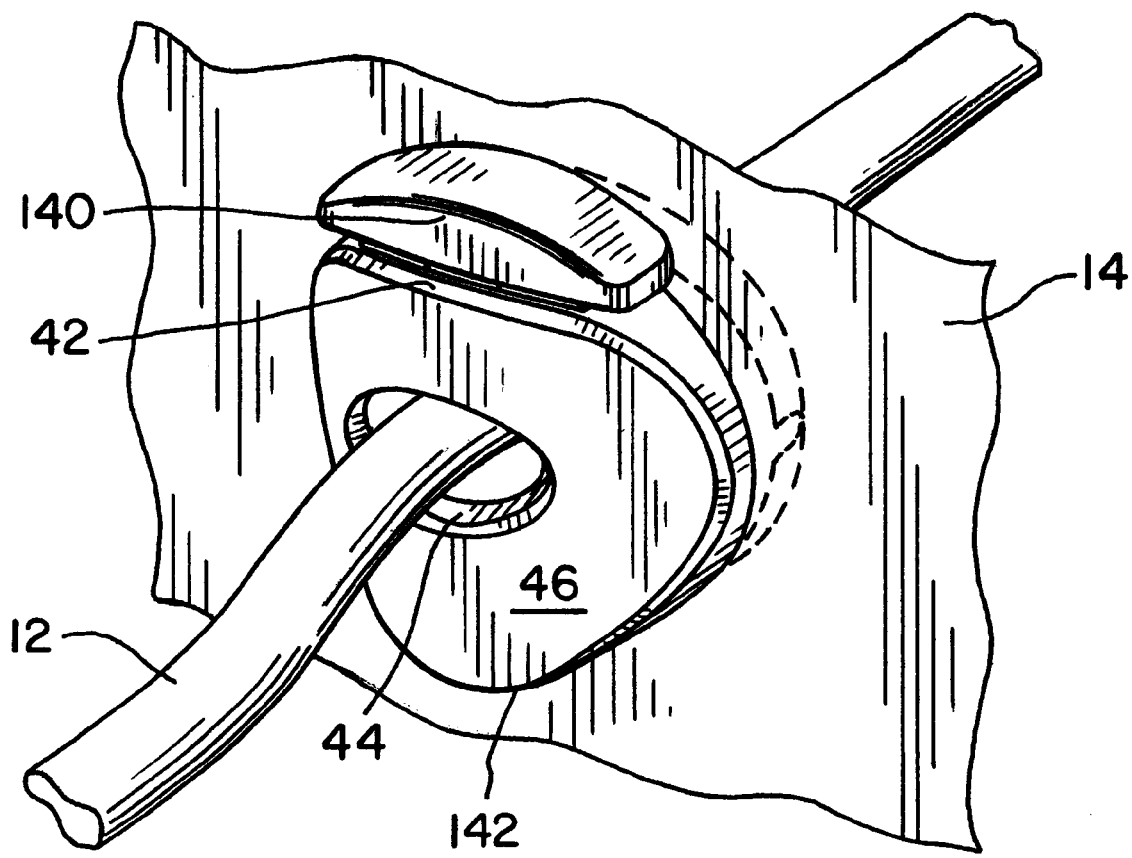
FIG. 9 is a perspective view of the second embodiment fully installed, with a cord installed in the cord lock.

Referring to FIG. 3, back plate 24 is a dome-shaped annular body defining a central opening 80 therein having an inwardly projecting ledge 82. Central opening 80 and ledge 82 are sized so as to allow back plate 24 to be pushed onto extension sleeve 18, with ledge 82 engaging projections 52 of extension sleeve 18. In one embodiment, ledge 82 is a plurality of segments or discrete tabs 84 (see FIG. 8) forming ledge 82, and is angled in central opening 80. At least one of the ledge 82 and sleeve 18 is adapted to have a limited degree of flexibility such that back plate 24 can be pushed onto extension sleeve 18, with ledge 82 and/or projections 52 deflecting sufficiently so that the ledge 82 ratchets over projections 52.

In the installation and use of cord lock 10, a hole or opening 90 is formed in the article or fabric 14 by punching, cutting or the like. Hole 90 is sufficiently large that extension sleeve 18 can be inserted therethrough; however, hole 90 should not be significantly larger than necessary to accept extension sleeve 18. Alternatively, opening 90 can be formed as a plurality of intersecting slits in article or fabric 14, allowing extension 18 to be inserted therethrough. Hole or opening 90 can be formed as an exit/entrance to a waistband, cuff or hood of clothing, bag opening or the like.

Figure 4:
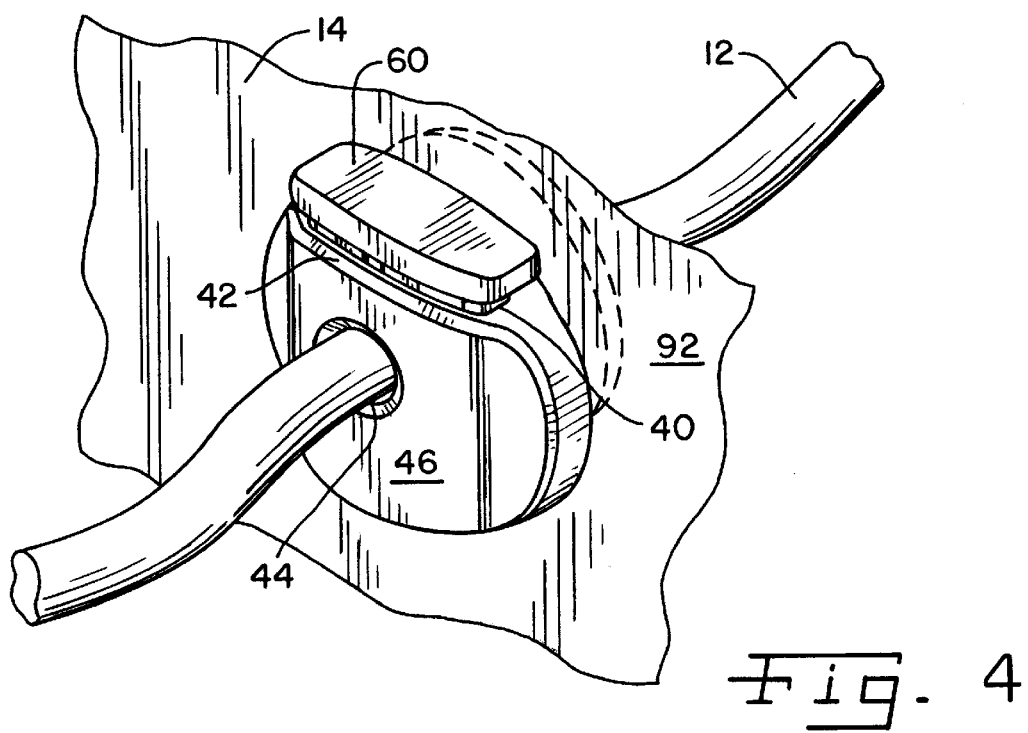
FIG. 4 is a perspective view of the cord lock installed on the fabric, with a cord installed in the cord lock.
Figure 5:
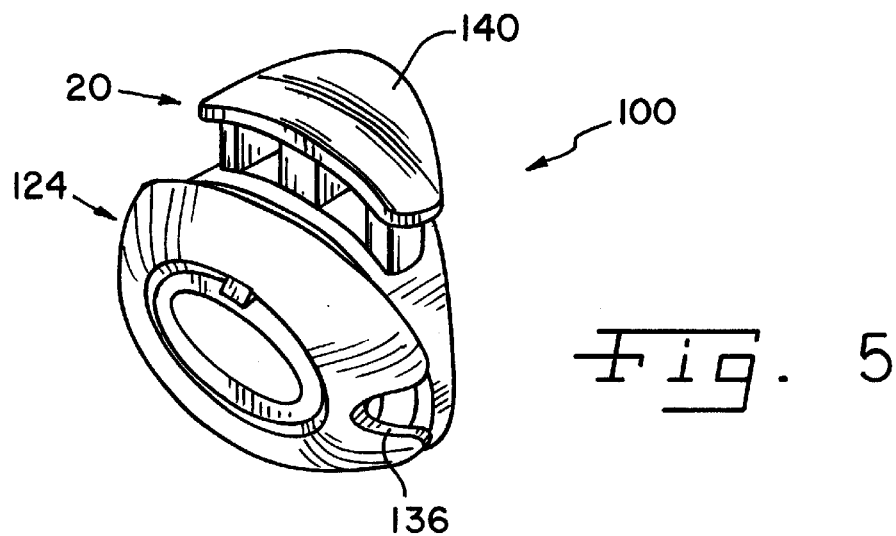
FIG. 5 is a perspective view of a second embodiment of a cord lock in accordance with the present invention.
Figure 6:
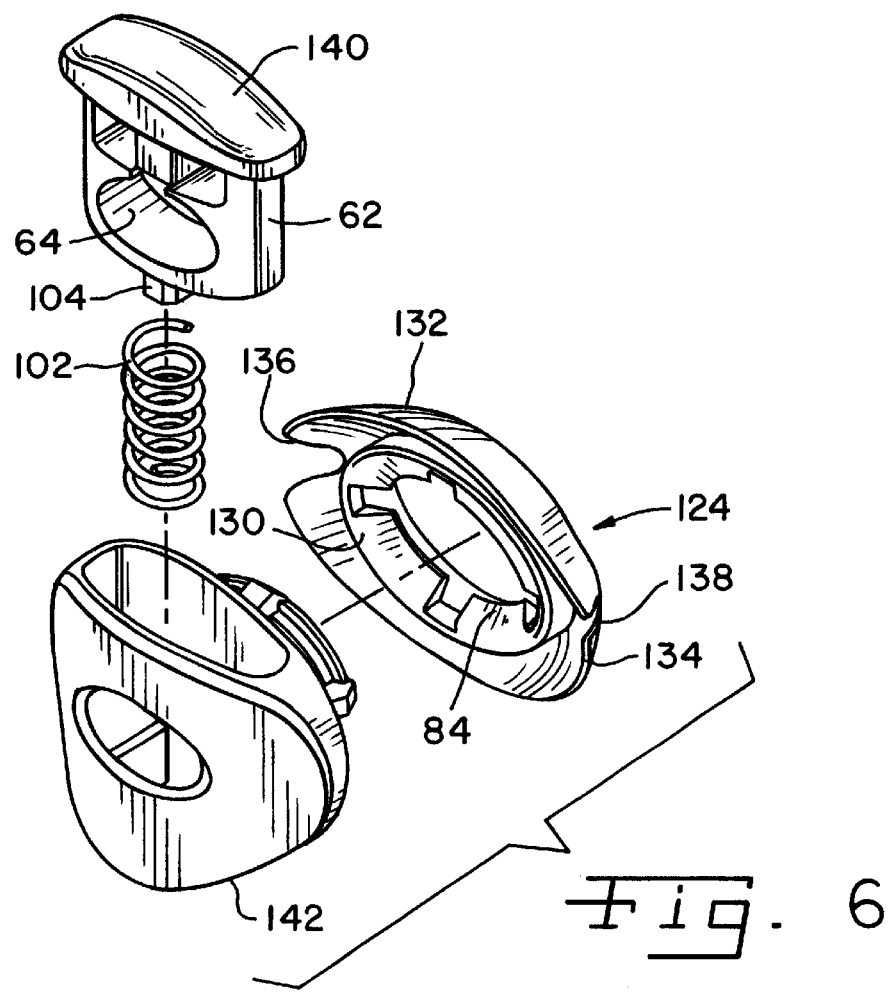
FIG. 6 is an exploded view of the cord lock shown in FIG. 5.
Figure 7:
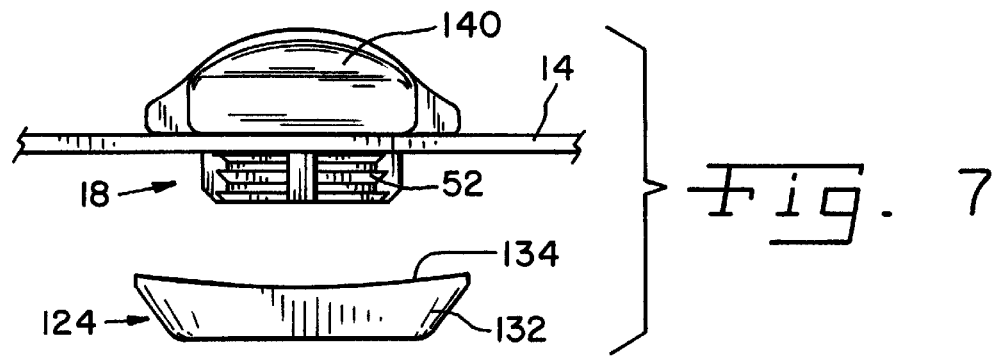
FIG. 7 is a exploded view from the side illustrating the manner in which the second embodiment is secured to an article.

With particular reference to FIGS. 3 and 4, extension sleeve 18 is inserted through hole 90 or slits (not shown) until a first side 92 of article or fabric 14 rests substantially against back wall 34 of body 16. Body 16 may be rotated such that pocket 30 faces in a suitable position for easy manipulation of plunger 20 in pocket 30. With body 16 acceptably positioned, back plate 24 is pushed onto extension sleeve 18, with ledge 82 thereof ratcheting over projections 52 on extension sleeve 18 until back plate 24 is moved against a second side 94 of article or fabric 14. Article or fabric 14 is then pinched between back plate 24 and body 16 such that cord lock 10 is secured as desired relative to article or fabric 14. By providing a series of projections 52 along a substantial length of extension sleeve 18, a cord lock 10 can be used on a variety of different articles or fabrics 14 of different thickness. Back plate 24 can be secured at several different positions along the length of extension sleeve 18, thus accommodating different articles thickness, with article or fabric 14 pinched between back plate 24 and body 16. When secured to article or fabric 14, cord lock 10 also functions as a grommet, binding the cut edges of fabric to reduce fraying or tearing at the fabric edge.

Plunger 20 is inserted in pocket 30 and depressed to compress spring means 22 such that plunger hole 64 is aligned with aligned holes 44 and 50. Advantageously, the size of plunger body 62 and the position of plunger hole 64 in plunger body 62 are selected such that plunger 20 can be substantially fully depressed, with plunger top 60 engaged against edge 42 when plunger hole 64 is aligned with aligned holes 44 and 50. With all holes 44, 50 and 64 in substantial alignment, cord 12 is inserted from one direction or the other such that it extends through body 16, plunger 20 and extension sleeve 18 with back plate 24 thereon. With plunger 20 depressed such that holes 64, 50 and 44 are aligned, cord 12 can be pulled in either direction, to selectively position cord 12 where desired along its length relative to cord lock 10.

When inward pressure on plunger 20 is released, spring means 22 urges plunger 20 outwardly relative to pocket 30, such that plunger hole 64 becomes misaligned with aligned holes 44 and 50. The misalignment of the holes with cord 12 extended through cord lock 10 creates a binding effect of cord 12 within body 16. Secured in this manner, cord 12 is not pulled easily in either direction relative to cord lock 10. When it becomes necessary or desirable to reposition cord 12 relative to cord lock 10, plunger 20 is depressed by applying force to plunger top 60, thereby compressing spring means 24 and realigning plunger hole 64 with aligned holes 44 and 50. Cord 12 can then be slid through cord lock 10 until the desired position of cord 12 relative to cord lock 10 is achieved. By again releasing plunger 20, cord 12 becomes bound within cord lock 10.

When used as the exit structure from a waistband, hood, cuff, etc. of clothing or in the hem of the opening of a bag, etc. cord lock 10 provides a smooth structure through which cord 12 can be pulled. Thus, tightening the cord is easier than if the cord must be pulled against a raw edge of material.

In addition to changes in general size and shape of cord lock 10 to accommodate different size cords 12, strings or the like, and attachment to other articles, further modifications thereof are also possible to achieve other advantages. FIGS. 5–9 illustrate a modified cord lock 100 that includes several different features. Spring means is provided as a separate coil spring 102, that can be made of metal or plastic. Coil spring 102 engages a post 104 on the end of plunger body 62 that first enters pocket 30. Spring means in the nature of coil spring 102 operates similarly to the aforedescribed structure of accordion legs 70, 72 and foot 74, to bias plunger body 62 outwardly relative to pocket 30.

Cord lock 100 further includes a modified back plate 124 having a center ring 130 and an outwardly projecting skirt 132 from the outer edge of ring 130. An edge 134 of skirt 132 is a gently scalloped, thereby being non-planar. Relief slots 136 and 138 are provided in skirt 132, generally on opposite sides of skirt 132, thereby separating skirt 132 into substantially semi-circular portions or two-halves. Skirt 132 is relatively thin and flexible, yet resilient, such that the semi-circular portions thereof can deflect and bend as skirt 132 pinches fabric 14 against back wall 34, and compressing force is applied against back plate 124. As skirt 132 bends, to flatten 134, article or fabric 14 is pinched more aggressively between back plate 124 and body 16. Further, the spring-back force from skirt 132 provides a locking or biasing force of ledge 82 against projections 52. Advantageously, central ring 130 defines a plurality of ring segments 84 for engaging projections 52 of extension sleeve 18. Alternatively, ledge 82 and projections 52 can define cooperative threads or thread segments by which a screw thread attachment is achieved. It is contemplated also that back wall 34 and/or back plate 24 can be provided with surface treatments such as texturing, projections or coatings to facilitate gripping article or fabric 14.

As yet a further modification in cord lock 100, plunger top 60 and body 16 are ergonomically shaped to facilitate grasping and pinching or squeezing, to depress plunger 20 in pocket 30. To this end, plunger top 60 includes a thickened edge 140 furthest from article or fabric 14, and body 16 includes an edge 142 generally opposite edge 42 that angles from front face 46 towards extension sleeve 18. Further, body 16 is curved rearwardly from the portion of front face 46 defining hole 44. The generally sloping, rearwardly projecting surfaces angling towards extension sleeve 18 generally urge fingers grasping cord lock 100 to slide towards back plate 24 and article or fabric 14. With cord lock 100 grasped between a thumb and forefinger of a user, the thumb and forefinger are less likely to slide forwardly off of front face 46 of cord lock 100 with the ergonomically advantageous shape described. It is further noted that in a preferred configuration, the back plate 124 sits below the plunger top 60 when the plunger top 60 is fully depressed (see FIG. 9). In this way, especially when the article or fabric 14 is of a thin or flexible material, when the user depresses the plunger, the users thumb and/or finger will not be pinched between the plunger top 60 and back plate 124.

The present invention provides a cord lock that can be secured or anchored to an article or fabric. The cord lock is more easily manipulated than cord locks loosely secured on a cord, or secured on lanyards or the like connected to the article or device. Thus, the present invention provides a more user friendly cord lock, and as a result of the anchoring structure, one that can be used on a variety of articles of different size and shape. The cord lock functions smoothly and easily.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention, and will enable others skilled in the art to utilize the invention. The claims are to be construed to include alternative embodiments to the extent permitted by the prior art.

Various features of the invention are set forth in the following claims.

What is claimed is:

1. A cord lock comprising:
   a body defining a hole extending therethrough and a pocket, said pocket having a pocket opening on an edge of said body;
   an annular sleeve having a sleeve hole aligned with said hole in said body, said sleeve connected to said body and projecting from said body;
   a plunger received in said pocket, said plunger defining a plunger hole, said plunger being moveable in said pocket substantially orthogonal to said aligned body and sleeve holes, said plunger adapted to be moved in said pocket between a first position in which said plunger hole is aligned with said aligned body and sleeve holes and a second position in which said plunger hole is misaligned with said aligned body and sleeve holes;
   spring means biasing said plunger toward said second position; and
   a back plate secured to said sleeve.

2. The cord lock of claim 1, said spring means being integral with said plunger.

3. The cord lock of claim 1, said spring means being a discrete spring separate from said plunger disposed in said pocket.

4. The cord lock of claim 1, said plunger having a top, said top being thicker at one edge thereof than at an opposite edge thereof.

5. The cord lock of claim 4, said body having an angular edge substantially opposite said pocket opening said angular edge angling toward said sleeve.

6. The cord lock of claim 1, said the back plate including a ring for engaging said sleeve and a skirt outwardly of said ring.

7. The cord lock of claim 6, said sleeve having ridges and said ring having tabs for engaging said ridges.

8. The cord lock of claim 6, said skirt being relatively thin and flexible, and having an outer edge of non-planer configuration.

9. The cord lock of claim 8, said sleeve having ridges and said ring having tabs for engaging said ridges.

10. The cord lock of claim 9, said plunger having a top externally of said pocket, and said body having an edge substantially opposite said top, said top and said edge of said body ergonomically shaped to facilitate gripping.

11. The cord lock of claim 10, said spring means being a discrete spring separate from said plunger; said spring being disposed in said pocket.

12. The cord lock of claim 10, said spring means being integral with said plunger.

13. A cord lock mountable on an article comprising;
    a body defining a hole adapted to receive a cord slidable therethrough;
    a plunger in said body for binding the cord in said body;
    an extension sleeve from said body for extending through a hole in the article, with said body disposed on one side of one said article; and
    a back plate engaged on said extension sleeve on an opposite side of said article from said body, said body and said plate adapted to pinch a portion of said article therebetween.

14. The cord lock of claim 13, said extension sleeve having ribs thereon, and said backplate having deflectable tabs for engaging said ribs.

15. The cord lock of claim 14, said back plate including a ring slidable on said extension sleeve and a skirt outwardly of said ring.

16. The cord lock of claim 15, said skirt having a non-planar edge and being adapted for deflection under compression against said body.

17. The cord lock of claim 13, said body and said extension sleeve defining aligned holes for receiving the cord.

18. The cord lock of claim 17, said plunger defining a hole for receiving the cord.

19. The cord lock of claim 13, wherein said plunger includes a plunger top that is configured in such a manner that when said plunger is depressed, said plunger top and said back plate are non-coplanar so as to inhibit pinching of a users thumb or fingers between said plunger top and said back plate.

20. A locking device comprising:
    a first body member having a sleeve extending outwardly therefrom; and
    a second body member having a first inner portion adapted to be positioned on to said sleeve and a second outer portion having a non-planar edge, said second outer portion being of flexible construction such that when an article is positioned between said first body member and said second body member, said non-planar edge is adapted for deflection under compression against said first body member to securely hold the article between said first body member and said second body member.

21. A method for assembling an article with a cord having a cord lock, said method comprising;
    providing an article, a cord, and a cord lock, the cord lock having a body, an extension sleeve and a back plate;
    forming an opening in the article;
    inserting the cord lock extension sleeve through the opening in the article;
    pinching a portion of the article between the body and the back plate, while securing the back plate on the extension sleeve; and
    inserting the cord in the cord lock and binding the cord relative to the cord lock.

22. The method of claim 21, said securing the back plate on the extension sleeve performed by push the back plate onto the extension sleeve.

* * * * *